(12) United States Patent
Watanabe

(10) Patent No.: US 6,169,633 B1
(45) Date of Patent: Jan. 2, 2001

(54) LENTICULAR LENS SHEET AND TRANSMISSION TYPE SCREEN USING THE SAME

(75) Inventor: Hitomu Watanabe, Tokyo-To (JP)

(73) Assignee: Dai Nippon Printing Co., Ltd. (JP)

( * ) Notice: Under 35 U.S.C. 154(b), the term of this patent shall be extended for 0 days.

(21) Appl. No.: 09/297,128

(22) PCT Filed: Sep. 10, 1998

(86) PCT No.: PCT/JP98/04085

§ 371 Date: Apr. 26, 1999

§ 102(e) Date: Apr. 26, 1999

(87) PCT Pub. No.: WO99/13362

PCT Pub. Date: Mar. 18, 1999

(30) Foreign Application Priority Data

Sep. 11, 1997 (JP) .................................................. 9-247121

(51) Int. Cl.⁷ ............................. G02B 27/10; G03B 21/60
(52) U.S. Cl. ........................ 359/626; 359/619; 359/457
(58) Field of Search ................................... 359/619, 621, 359/625, 626, 457, 455, 456

(56) References Cited

U.S. PATENT DOCUMENTS

| | | | |
|---|---|---|---|
| 4,452,509 | * 6/1984 | VanBreeman | 359/457 |
| 4,979,801 | * 12/1990 | Park | 359/457 |
| 5,457,572 | * 10/1995 | Ishii et al. | 359/457 |
| 5,642,226 | * 6/1997 | Rosenthal | 359/619 |
| 5,644,431 | * 7/1997 | Magee | 359/619 |

FOREIGN PATENT DOCUMENTS

| | | |
|---|---|---|
| 54-156 534 | 12/1979 | (JP) . |
| 58-059 436 | 4/1983 | (JP) . |
| 58-095 725 | 6/1983 | (JP) . |
| 58-127 919 | 7/1983 | (JP) . |
| 58-134 627 | 8/1983 | (JP) . |
| 63-212 925 | 9/1988 | (JP) . |
| 1-167829 | 7/1989 | (JP) . |
| 8-179427 | 7/1996 | (JP) . |

* cited by examiner

Primary Examiner—Ricky Mack
(74) Attorney, Agent, or Firm—Parkhurst & Wendel, L.L.P.

(57) ABSTRACT

A lenticular lens sheet 10A comprises, on the light-entering surface thereof, a light-entering lens part in which a plurality of light-entering lenses 11 are formed, and, on the light-emerging surface, a light-emerging lens part in which a plurality of light-emerging lenses 12 are formed. The light-emerging lenses 12 are so arranged that they respectively correspond to the condensing positions of the light-entering lenses 11. Further, a protruded portion 13A having a substantially rectangular cross section is formed on the light-emerging surface, at a position corresponding to the non-condensing position of each one of the light-entering lenses 11, and a black stripe 14 is formed on the top face 13a of this protruded portion 13A by the application of a light-absorbing agent. The light-entering lens 11 is in the shape of a convex lens projecting toward the light-entering side, and so designed that its condensing point will be inside the lenticular lens sheet 10A. Further, the light-emerging lens 12 is in the shape of a concave lens projecting toward the inside of the lenticular lens sheet 10A. By this, it is possible to make the lenticular lens thick while keeping the pitch thereof fine, and, moreover, to increase the black stripe rate.

16 Claims, 5 Drawing Sheets

LENTICULAR LENS SHEET AND TRANSMISSION TYPE SCREEN USING THE SAME

TECHNICAL FIELD

The present invention relates to a lenticular lens sheet suitable for projecting thereon an image from an imaging light source having a cellular structure such as an LCD (Liquid Crystal Display) or DMD (Digital Micromirror Device), and to a rear projection screen using the same.

BACKGROUND ART

There have conventionally bee known rear projection type televisions comprising an imaging light source consisting of three CRTs (Cathode Ray Tubes) of red, green and blue, and a rear projection screen.

In such projection televisions, for example, a combination of a Fresnel lens sheet for making rays projected from the CRTs almost parallel with each other, and a light-diffusing sheet for diffusing light over a wide range is used as the rear projection screen. Used herein as the light-diffusing sheet is a lenticular lens sheet in which lens elements light-entering lenses) for condensing light such as lenticular lenses are formed on the light-entering side, and a light-emerging face is formed in the vicinity of the focal points of these light-entering lenses. Further, a light-absorbing layer (black stripe) is provided on the light-emerging face of the lenticular lens sheet, between the focal points of the light-entering lenses, so that light can be diffused and that the effects of extraneous light can be reduced.

By the way, in such projection televisions, those ones using as the imaging light source an LCD, DMD or the like have been developed. Since the LCD, DMD or the like has a cellular structure, a grating pattern originated from such cellular structure is to be projected on the rear projection screen. For the rear projection screen, a lenticular lens sheet or the like having a cyclic structure with a constant pitch is used. Therefore, when an image is projected on such a rear projection screen and observed, a moire pattern may appear due to the sampling effect of the lenticular lenses (light-entering lenses).

In order to prevent the production of such a moire pattern, it is preferable to make the pitch of the lenticular lens as small as 1/3.5 or less of the grating constant of the grating pattern projected. Further, in those projection televisions using an LCD, DMD or the like, the glaring of an image called scintillation occurs. To make the pitch of the lenticular lens small is also effective for attenuating this scintillation. In the above-described rear projection screen using a lenticular lens sheet provided with light-absorbing layers (black stripes), it has generally been known that it is necessary to make the distance between the lenticular lenses (light-entering lenses) and the light-emerging face not greater than approximately 1.3 times the pitch of the lenticular lens if light is diffused over such a wide range that the angle of deviation (angle of diffusion) is 40° or more, and black stripes are to be formed on the light-emerging face.

For this reason, in the conventional rear projection screens, in order to make a moire pattern which appears due to both the grating pattern projected on the rear projection screen and the cyclic structure of the lenticular lenses obscure, the pitch of the lenticular lens is made 0.4 mm or less, and the thickness of the lenticular lens sheet, which corresponds to the distance between the lenticular lenses and the light-emerging face, is made 0.52 mm or less.

SUMMARY OF THE INVENTION

However, in the conventional rear projection screens, when the thickness of the lenticular lens sheet is made small, the rigidity is decreased, so that it becomes difficult to maintain the lenticular lens sheet flat. Further, it is quite difficult to form a thin lenticular lens sheet by means of extrusion molding or the like with high accuracy. Furthermore, under the present conditions, the power of a light source using an LCD, DMD or the like is not so high as that of a light source using three CRTs of red, green and blue, and the contrast is also poor. Therefore, those rear projection screens which are used in combination with an LCD, DMD or the like are demanded to have high contrast as compared with the conventional rear projection screens which are used along with CRTs The most effective method for improving the contrast of a rear projection screen using a lenticular lens sheet is to increase the ratio of a total area of light-absorbing layers (black stripes) to area of light-emerging face of the screen (black stripe ratio).

The present invention was accomplished in the light of the foregoing. An object of the present invention is to provide a lenticular lens sheet and a rear projection screen using the lenticular lens sheet, in which the thickness of a lenticular lens can be increased while keeping its pitch fine, and the black stripe ratio can also be increased.

A first aspect of the present invention is a lenticular lens sheet comprising a light-entering lens part formed on the light-entering surface, in which a plurality o light-entering lenses, each having a substantially elliptical cross section are arranged, and a light-emerging lens part formed on the light-emerging surface, in which a plurality of light-emerging lenses, each having a concave-lens-like cross section are arranged so at they correspond to the condensing positions of the respective light-entering lenses in the light-entering lens part.

A second aspect of the present invention is a lenticular lens sheet comprising a light-entering lens part formed on the light-entering surface, in which a plurality of light-entering lenses, each having a substantially elliptical cross section are arranged, a light-emerging lens part formed on the light-emerging surface, in which a plurality of light-emerging lenses, each having a concave-lens-like cross section are arranged so that they correspond to the condensing positions of the respective light-entering lenses in the light-entering lens part, and a plurality of light-absorbing layers formed on the light-emerging surface, arranged so that they correspond to the non-condensing positions of the respective light-entering lenses in the light-entering lens part.

A third aspect of the present invention is a rear projection screen for use in a rear projection type television, comprising a Fresnel lens sheet for making projected rays almost parallel with each other, and a lenticular lens sheet arranged on the light-emerging of the Fresnel lens sheet, wherein the lenticular lens sheet comprises a light-entering lens part formed on the light-entering surface, in which a plurality of light-entering lenses, each having a substantially elliptical cross section are arranged, and a light-emerging lens part formed on the light-emerging surface, in which a plurality of light-emerging lenses, each having a concave-lens-like cross section are arranged so that they correspond to the condensing positions of the respective light-entering lenses in the light-entering lens part.

A fourth aspect of the present invention is a rear projection screen for use in a rear projection type television, comprising a Fresnel lens sheet for making projected rays almost parallel with each other, and a lenticular lens sheet arranged on the light-emerging of the Fresnel lens sheet, wherein the lenticular lens sheet comprises a light-entering lens part formed on the light-entering surface, in which a plurality of light-entering lenses, each having a substantially elliptical cross section are arranged, a light-emerging lens part formed on the light-emerging surface, in which a plurality of light-emerging lenses, each having a concave-lens-like cross section are arranged so that they correspond to the condensing positions of the respective light-entering lenses in the light-entering lens part, and a plurality of light-absorbing layers formed on the light emerging surface, arranged so that they correspond to the non-condensing positions of the respective light-entering lenses in the light-entering lens part In the above-described second and fourth aspects of the present invention, it is preferable that a protruded portion having a substantially trapezoidal cross section be formed on the light-emerging surface, at a position corresponding to the non-condensing position of each one of the above-described light-entering lenses in the above-described light-entering lens part and that the above-described light-absorbing layers be formed on the top faces of these protruded portions. Moreover, it is preferable that he light-absorbing layers be also formed on the inclined faces, in addition to the top faces, of the protruded portions.

According to the first to fourth aspects of the present invention, since the light-emerging lenses in the light-emerging lens part are made in the shape of a concave lens, it is possible to make the thickness to pitch of the lenticular lens sheet great, and thus to reduce the production of a moire pattern while maintaining the mechanical strength.

Further, in the above-described second and fourth aspects of the present invention, by forming protruded portions, each having a substantially trapezoidal cross section, on the light-emerging surface, at those positions which correspond to the non-condensing positions of the respective light-entering lenses in the light-entering lens part, it is possible to effectively prevent the protruded portions from being exposed to light emerged from the light-emerging lenses. Therefore, light from a light source can effectively utilized even when an LCD or DMD whose power is lower than that of a CRT is used. In addition, by forming light-absorbing layers also on the inclined faces, in addition to the top faces, of the protruded portions, it is possible to increase the black stripe ratio on the light-emerging surface.

BEST MODE FOR CARRYING OUT THE INVENTION

By referring to the accompanying drawings, embodiments of the present invention will be described in detail hereinafter.

First Embodiment

Figure 1:
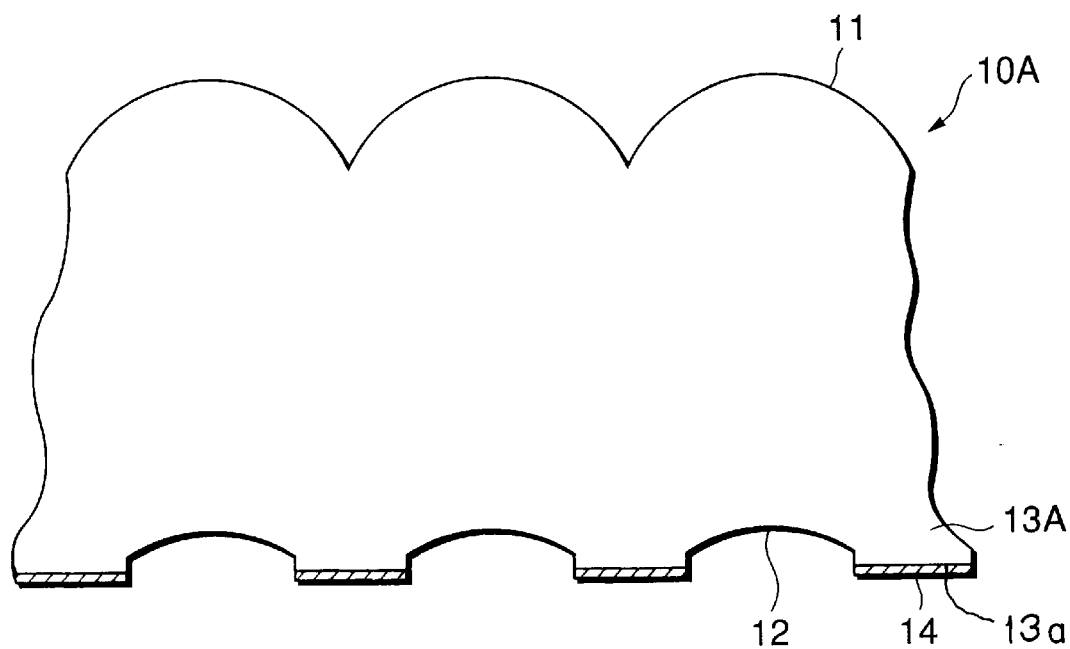
FIG. 1 is a view showing a first embodiment of the lenticular lens sheet according to the present invention.
Figure 2:
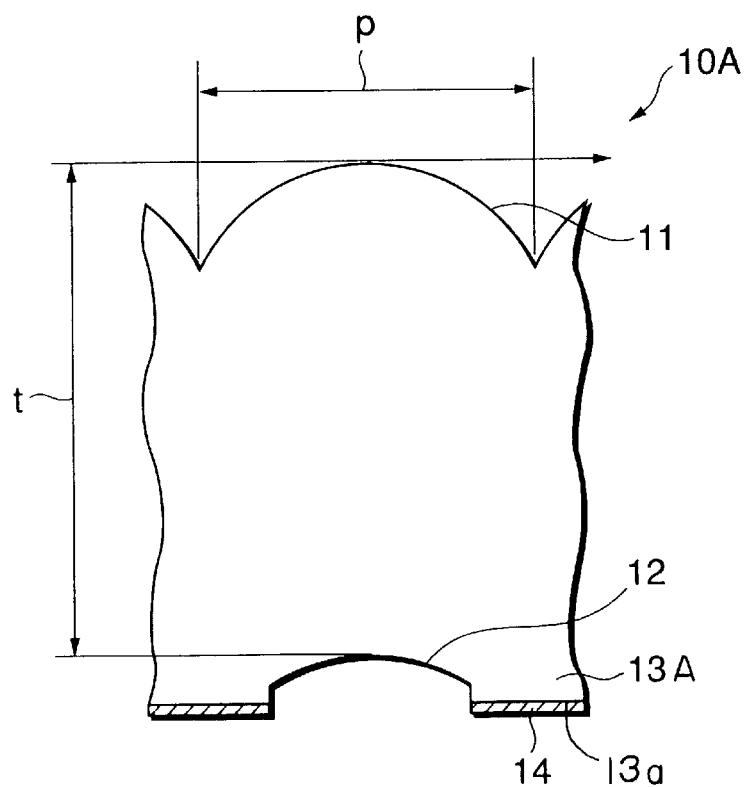
FIG. 2 is an enlarged view of the lenticular lens sheet shown in FIG. 1.

FIGS. 1 and 2 are views showing a first embodiment of the lenticular lens sheet according to the present invention.

As shown in FIGS. 1 and 2 a lenticular lens sheet 10A comprises, on the light-entering surface thereof, a light-entering lens part in which a plurality of light-entering lenses 11 are formed, and, on the light-emerging surface, a light-emerging lens part in which a plurality of light-emerging lenses 12 are formed, wherein the light-emerging lenses 12 are arranged so that they respectively correspond to the condensing positions of the light-entering lenses 11. Further, a protruded portion 13A having an almost rectangular cross section is provided on the light-emerging surface, at a position corresponding to the non-condensing position of each one of the light-entering lenses 11, and a black stripe (light-absorbing layer) 14 is provided on the top face 13a of this protruded portion 13A by the application of a light-absorbing agent. It is noted that a diffusing agent such as glass beads or acrylic beads may entirely be incorporated into the lenticular lens sheet 10A.

Of these, the light-entering lens 11 is in the shape of a convex lens projecting toward the light-entering side, and so designed that its condensing point (condensing position) will be inside the lenticular lens sheet 10A. Further, the light-emerging lens 12 is in the shape of a concave lens projecting toward the inside of the lenticular lens sheet 10A. For this reason, as shown in FIG. 2, when the pitch of each light-entering lens and the thickness of the lenticular lens sheet are indicated by p and t, respectively, it is possible to increase the ratio of the thickness t to the pitch p to approximately 1.9, although this ratio is generally from 1.1 to 1.3.

Substantially elliptical, such as circular, elliptical and aspherical shapes can be used as the shape of the cross section of the light-entering lens 11. Further, concave-lens-like shapes such as concave circle, concave ellipse, concave hyperbola and concave parabola can be used as the shape of he cross section of the light-emerging lens 12.

In FIGS. 1 and 2, when the light-emerging lens 12 is made in the shape of a concave lens, it is proper that the light-entering lens 11 be made in a shape represented by the following equation (1). In this case, it is preferable to make the conical coefficient k in the equation (1) fall in the range $-0.35 \leq k \leq -0.1$, preferably in the range $-0.3 \leq k \leq -0.2$. Further, it is proper to suitably fix the value of the constant c in consideration of the relationship between the thickness and diffusion angle of the lenticular lens sheet. It is herein preferable to make the value of p/2c fall in the range of 0.8 to 1.0 (when the value of p/2c is too large, it is necessary to make the thickness small; on the contrary, when this value is too small, the angel of diffusion cannot be obtained).

$$y = \frac{x^2/c}{1 + \sqrt{1 - (k+1)(x/c)^2}} \qquad (1)$$

Figure 3:
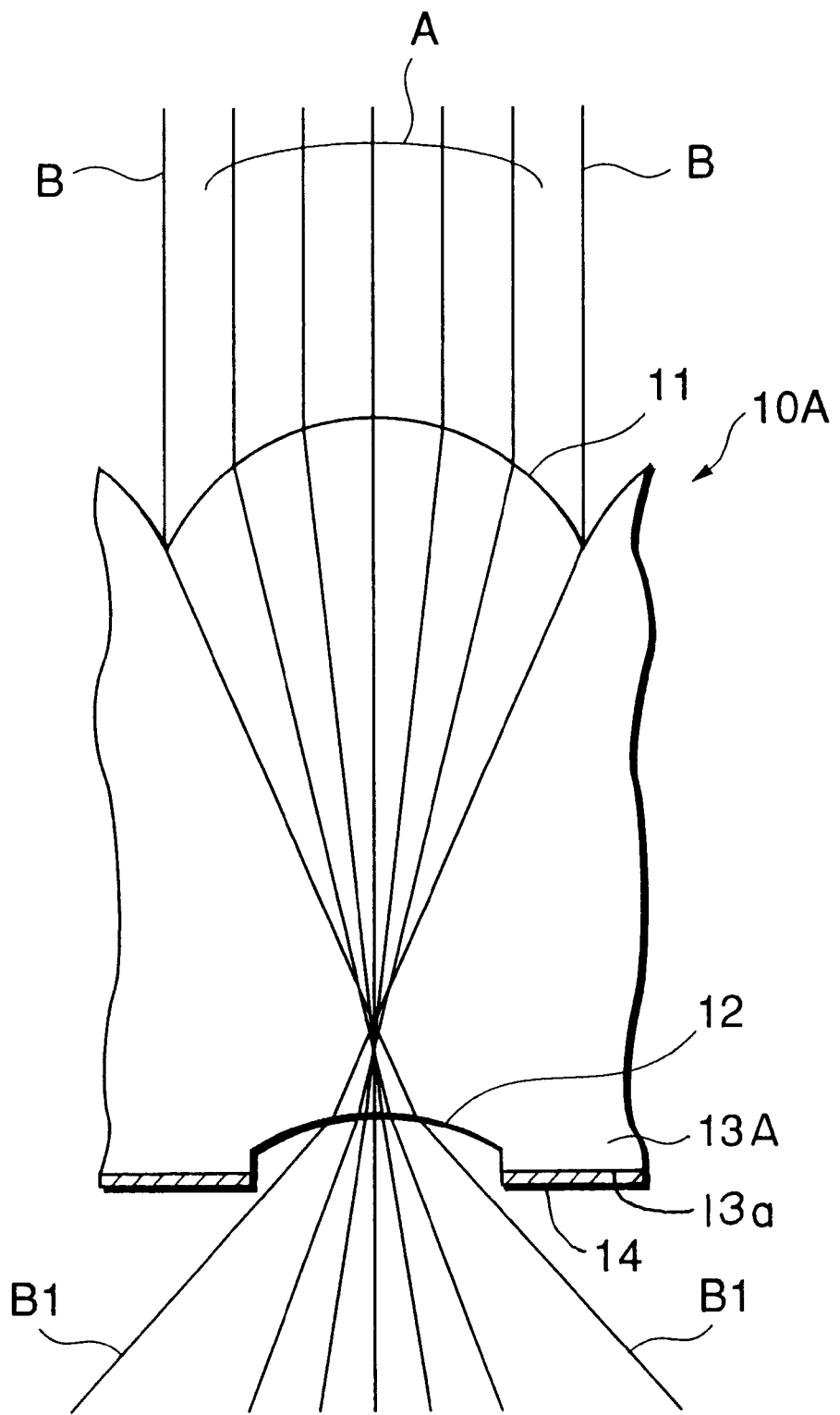
FIG. 3 is a view showing the optical path of imaging light in the lenticular lens sheet shown in FIGS. 1 and 2.

FIG. 3 is a view showing the optical path of imaging light in the lenticular lens sheet 10A shown in FIGS. 1 and 2.

As shown in FIG. 3, light A which has entered the light-entering lens 11 from the vicinity of the center thereof forms a condensing point in the vicinity of the light-emerging lens 12. Further, light B which has entered the light-entering lens 11 from the periphery thereof forms a condensing point at the inner part of the light-emerging lens 12, and is refracted by the light-emerging lens 12 toward the outside of the light A refracted (see the symbol B1 in FIG. 3).

Figure 4:
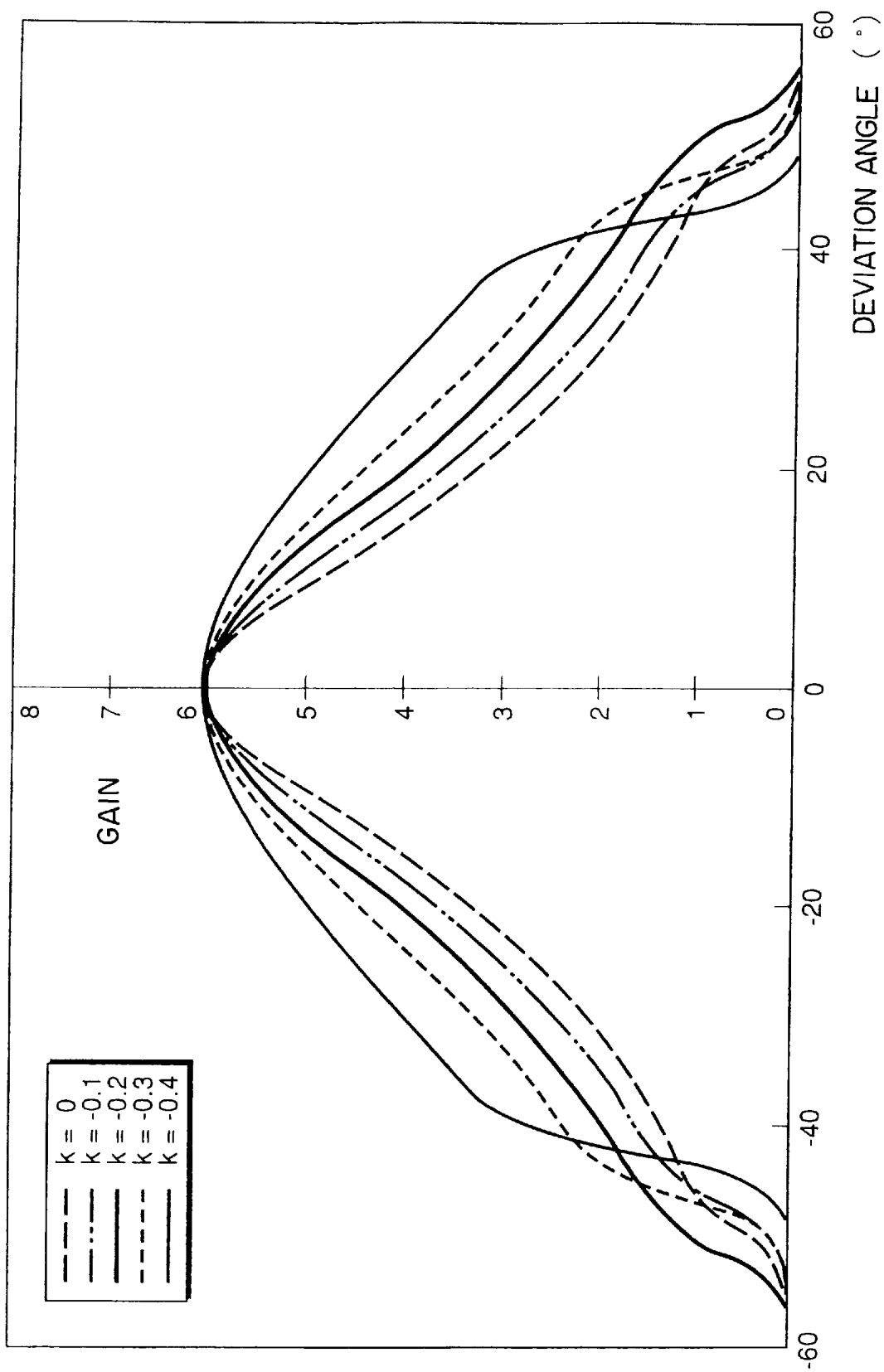
FIG. 4 is a graph showing the distribution of gains on the observation side of the lenticular lens sheet shown in FIGS. 1 and 2.

FIG. 4 is a graph showing the distribution of gains of the lenticular lens sheet 10A shown in FIGS. 1 and 2.

In the first embodiment of the present invention, regarded as important are to ensure approximately 30° as the deviation angle (horizontal half angle ($\alpha$H)) at which the gain is ½ of the central gain (the gain when the deviation angle is 0°), and to make both the central gain and the gain when the deviation angle is not less than 50° sufficiently high.

As shown in FIG. 4, when the conical coefficient k is greater than −0.3 and smaller than approximately −0.35, the horizontal half angle ($\alpha$H) increases; however, cutoff occurs at a deviation angle of approximately 40°, and the central gain decreases in proportion to the increase in horizontal half angle ($\alpha$H) (since FIG. 4 shows gains relatively so that the central gains will be constant at the respective conical coefficients k, the latter relationship is not shown in this figure). On the other hand, when the conical coefficient k is greater than −0.1, the horizontal half angle ($\alpha$H) is approximately 20°, so that such a conical coefficient is unfavorable.

Thus, according to the first embodiment of the present invention, since the light-emerging lens 12 is made in the shape of a concave lens, the thickness t to the pitch p of the lenticular lens sheet 10A can be made great. It is therefore possible to reduce the production of a moirépattern while maintaining the mechanical strength.

Second Embodiment

Figure 5:
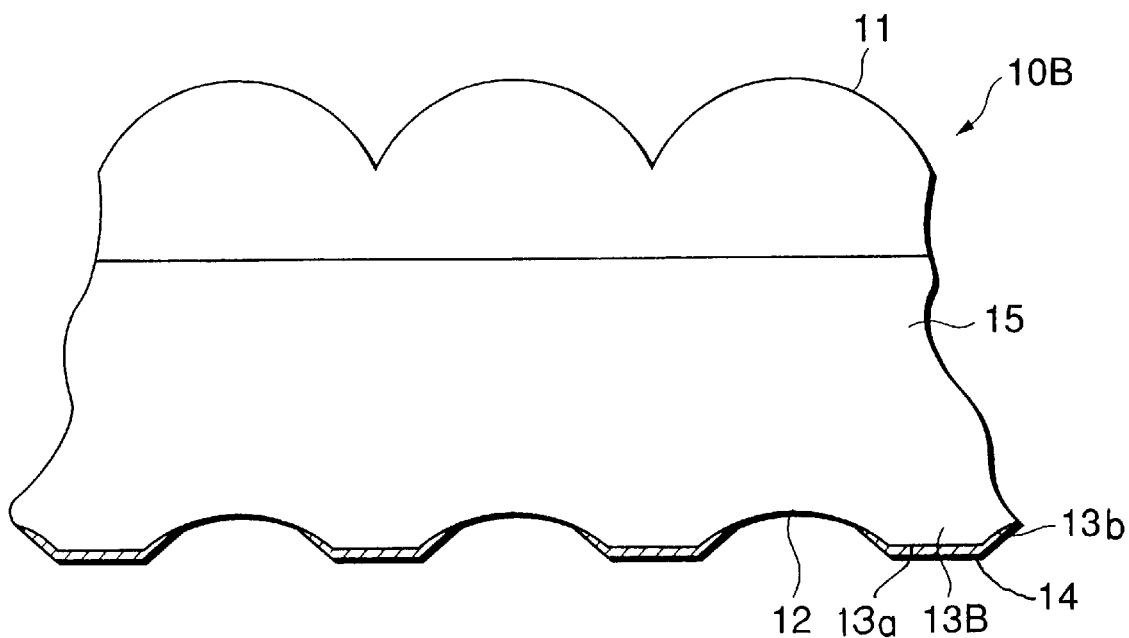
FIG. 5 is a view showing a second embodiment of the lenticular lens sheet according to the present invention.

FIG. 5 is a view showing a second embodiment of the lenticular lens sheet according to the present invention. It is noted that, in the second embodiment of the present invention, those parts which have the same functions as in the above-described first embodiment are indicated by the same symbols, and detailed descriptions for these parts are suitably omitted.

As shown in FIG. 5, in a lenticular lens sheet 10B of the second embodiment of the present invention, a protruded portion 13B having a substantially trapezoidal cross section is formed on the light-emerging surface, at a position corresponding to the non-condensing position of each one of the light-entering lenses 11, and a black stripe (light-absorbing layer) 14 is formed on both the top face 13a and inclined face 13b of this protruded portion 13B by applying thereto a light-absorbing agent. It is preferable that the ratio of the black stripes 14 (black stripe rate) on the light-emerging surface be 60% or more.

Further, as shown in FIG. 5, a diffusing layer 15 for diffusing light which has entered through the light-entering lenses 11 may be formed in the lenticular lens sheet 10E. In this case, the above-described protruded portions 13B are formed on the light-emerging surface of the diffusing layer 15. It is noted that the diffusing layer 15 can be formed, for example, by incorporating a diffusing agent such as glass beads or acrylic beads.

Thus, according to the second embodiment of the present invention, since the cross section of the protruded portion 13B is made substantially trapezoidal, it is possible to effectively prevent the protruded portions 13B from being exposed to light emerged from the light-emerging lenses 12 as compared with the case where the cross section of the protruded portion 13A is made substantially rectangular as in the above-described first embodiment. For this reason, light from a light source can effectively be utilized even when an LCD or DMD whose power is lower than that of a CRT is used.

Further, according to the second embodiment of the present invention, black stripes 14 are also formed on the inclined faces 13b, in addition to the top faces 13a, of the protruded portions 13B, each having a substantially trap- ezoidal cross section, so that it is possible to make the black stripe rate on the light-emerging surface high as compared with the above-described first embodiment.

Third Embodiment

Figure 6:
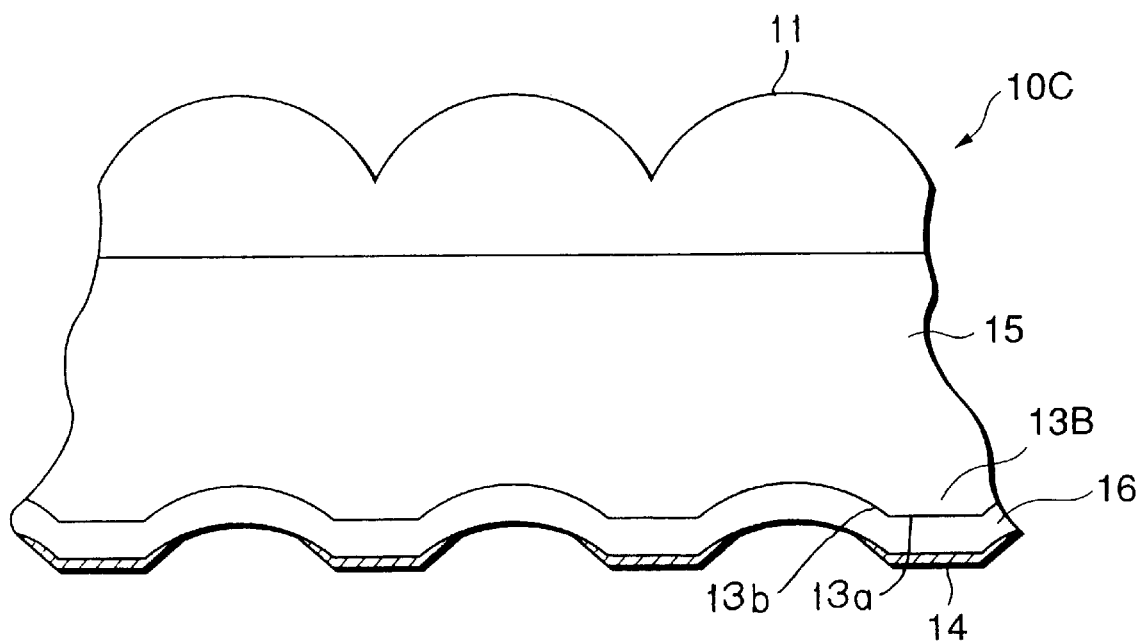
FIG. 6 is a view showing a third embodiment of the lenticular lens sheet according to the present invention.

FIG. 6 is a view showing a third embodiment of the lenticular lens sheet according to the present invention. It is noted that, in the third embodiment of the present invent those parts which have the same functions as in the above-described first embodiment are indicated by the same symbols, and detailed descriptions for these parts are suitably omitted.

As shown in FIG. 6, in a lenticular lens sheet 10C of the third embodiment of the present invention, a diffusing layer 15 for diffusing light which has entered through light-entering lenses 11 is formed by incorporating a diffusing agent such as glass beads or acrylic beads, and a protruded portion 13B having a substantially trapezoidal cross section is formed on the light-emerging surface of this diffusing layer 15, at a position corresponding to the non-condensing position of each one of the light-entering lenses 11. Further, a non-diffusing layer 16 containing no diffusing agent is entirely formed on the light-emerging surface of the diffusing layer 15, including the protruded portions 13B.

Thus, according to the third embodiment, since the non-diffusing layer 16 is entirely formed on the light-emerging surface of the diffusing layer 15, including the protruded portions 13B, it is possible to prevent the uneven application of the light-absorbing agent which is applied to the top faces 13a and inclined faces 13b of the protruded portions 13B to form the black stripes 14. For this reason, it is possible to effectively prevent the lenticular lens sheet from having a rough appearance which is brought about due to the unevenness especially on the inclined faces 13b.

Embodiment of Rear Projection Screen

Figure 7:
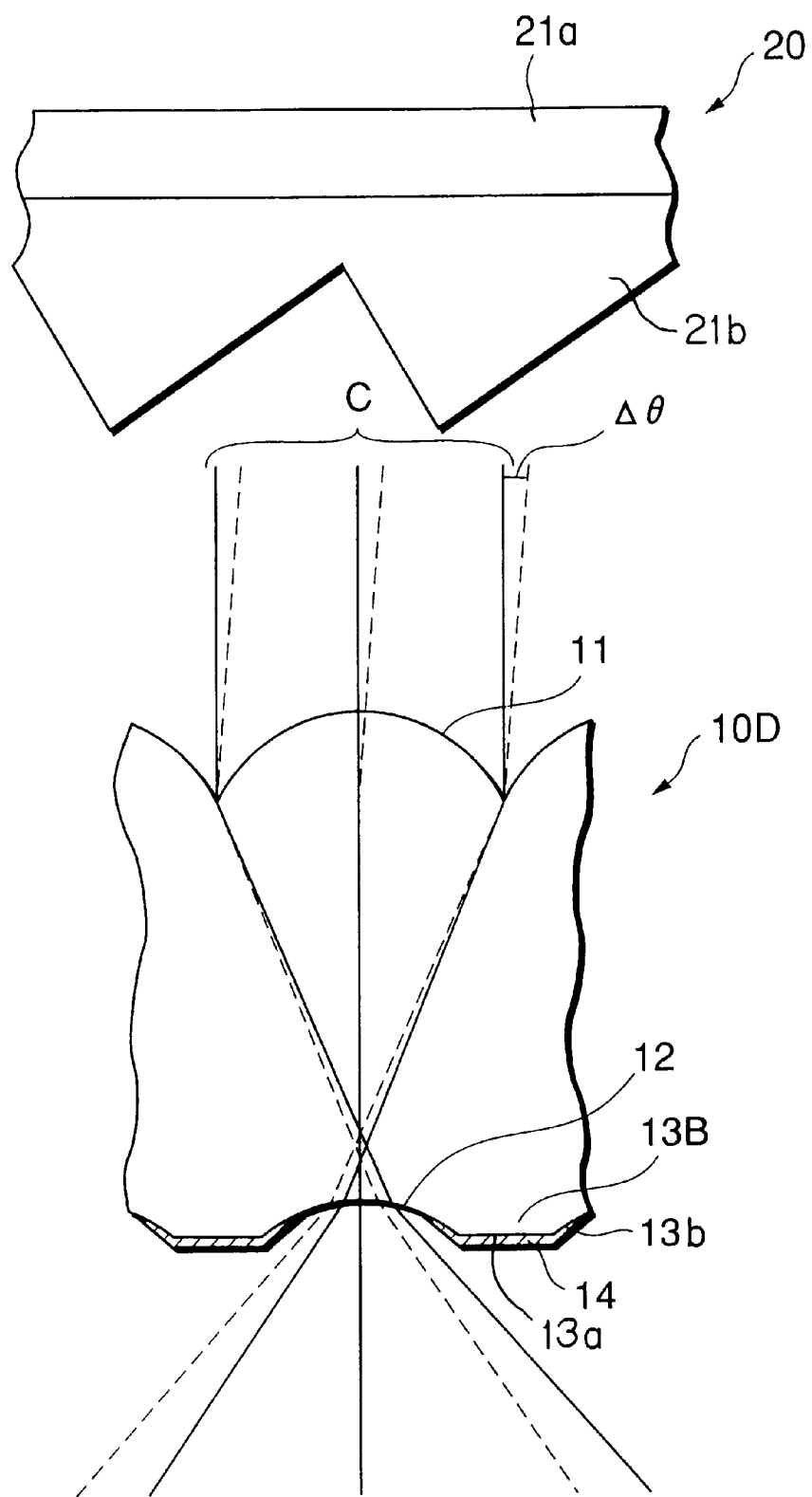
FIG. 7 is a view showing one embodiment of the rear projection screen according to the present invention.

FIG. 7 is a view showing one embodiment of the rear projection screen according to the present invention.

As shown in FIG. 7, a rear projection screen of this embodiment is for use in a rear projection type television, and comprises a Fresnel lens sheet 20 for making projected rays almost parallel with each other, and a lenticular lens sheet 10D arranged on the light-emerging side (observation side) of the Fresnel lens sheet 20. It is noted that this lenticular lens sheet 10D corresponds to a case where the diffusing layer 15 is not formed in the lenticular lens sheet 10B shown in FIG. 2.

In projection televisions using in LCD or DMD, the glaring of an image called scintillation is cause. In order to reduce such scintillation, it is common to provide, as a light-diffusing element, a portion in which a light-diffusing agent s incorporated, as described in Japanese Patent Laid-Open Publication No. 313865/1996.

Therefore, in the rear projection screen of this embodiment, the Fresnel lens sheet 20 is made with a base 21a and a Fresnel lens part 21b, and the light-diffusing element is formed by incorporating a predetermined amount of a diffusing agent into the base 21a. By this, as shown in FIG. 7, light C which enters the lenticular lens sheet 10D is diffused in the horizontal direction at an angle of $\Delta\theta$ (approximately 3°) by the diffusing agent incorporated into the base 21a of the Fresnel lens sheet 20. It is noted that a circular Fresnel lens, a linear Fresnel lens or the like with its lens face facing the observation side is suitably used as the Fresnel lens part 21b.

Thus, according to the rear screen of this embodiment, since the horizontal diffusion properties of light C which enters the lenticular lens sheet 10D can further be broadened due to the diffusing agent incorporated into the base 21a of the Fresnel lens sheet 20, it is possible to reduce scintillation.

It is noted that, in the above-described embodiment, the lenticular lens sheet 10A, 10B or 10 shown in FIG. 1, 5 or 6, respectively, can be used as the lenticular lens sheet.

EXAMPLES

Next, specific examples of the aforementioned lenticular lens sheets of the first to third embodiments, and those of the rear projection screens using the same will now be described.

Example 1

Example 1 corresponds to the lenticular lens sheet 10A of the above-described first embodiment (see FIGS. 1 and 2). By the use of a resin obtained by incorporating 7.2 parts by weight of acrylic beads having a mean particle diameter of 30 μm (refractive index 1.49) and 1.2 parts by weight of glass beads having a mean particle diameter of 17 μm (refractive index 1.535) into 100 parts by weight of an impact-resistant acrylic resin (refractive index 1.51), the lenticular lens sheet 10A was formed by means of extrusion molding as a single layer.

The protruded portion 13A was formed so that the side (inclined face) thereof would protrude almost vertically (5°), and the black stripe 14 was formed by applying a light-absorbing agent only to the top face 13a of the protruded portion 13A. The height of the protruded portion 13A provided with the black stripe 14 was made 0.08 mm, and the black stripe ratio on the light-emerging surface was made 40%. Further, the pitch p of the light-entering lens 11 was made 0.36 mm, and the thickness t of the lenticular lens sheet 10A was made 0.67 mm (t/p=1.9). Furthermore, the conical coefficient k of the light-entering lens 11 was made −0.1. In addition, the value of c in the above equation (1) was made 0.212, and the value of p/2c in the same was made 0.85.

Example 2

Example 2 corresponds to the lenticular lens sheet 10B of the above-described second embodiment (see FIG. 5). By the use of an impact-resistant acrylic resin (refractive index 1.51), the lenticular lens sheet 10B was formed by means of extrusion molding as double layers (a layer of the light-entering lens 11 and the diffusing layer 15). At this time, 10.8 parts by weight of acrylic beads having a mean particle diameter of 30 μm (refractive index 1.49), and 1.8 parts by weight of glass beads having a mean particle diameter of 17 μm (refractive index 1.535) were incorporated into the diffusing layer 15 as diffusing agents.

The protruded portion 13B was formed so that the side (inclined face 13b) thereof would protrude at an angle of 50°, and the black stripe 14 was formed by applying a light-absorbing agent to both the top face 13a and inclined face 13b of the protruded portion 13B. The height of the protruded portion 13B provided with the black stripe 14 was made 0.06 mm, and the black stripe ratio on the light-emerging surface was made 65%. Further, the pitch p of the light-entering lens 11 was made 0.35 mm, and the thickness t of the lenticular lens sheet 10A was made 0.54 mm (t/p=1.5). Furthermore, the conical coefficient k of the light-entering lens 11 was made −0.3. In addition, the value of c in the above equation (1) was made 0.1764, and the value of p/2c in the same was made 0.99.

Example 3

Example 3 corresponds to the lenticular lens sheet 10C of the above-described third embodiment (see FIG. 6). By the use of an impact-resistant acrylic resin (refractive index 1.51), the lenticular lens sheet 10C was formed by means of extrusion molding as three layers (a layer of the light-entering lens 11, the diffusing layer 15 and the non-diffusing layer 16). At this time, 10.8 parts by weight of acrylic beads having a mean particle diameter of 30 μm (refractive index 1.49), and 1.8 parts by weight of glass beads having a mean particle diameter of 17 μm (refractive index 1.535) were incorporated into the diffusing layer 15 as diffusing agents.

The protruded portion 13B was formed so that the side (inclined face 13b) thereof would protrude an angle of 50°, and the black stripe 14 was formed by applying a light-absorbing agent to both the top face 13a and inclined face 13b of the protruded portion 13B. The height of the protruded portion 13B provided with the black stripe 14 was made 0.06 mm, and the black stripe rate on the light-emerging-side surface was made 65%. Further, the pitch p of the light-entering lens 11 was made 0.35 mm, and the thickness t of the lenticular lens sheet 10C was made 0.54 mm (t/p=1.5). Furthermore, the conical coefficient k of the light-entering lens 11 was made −0.3. In addition, the value of in the above equation (1) was made 0.1764, and the value of p/2c in the same was made 0.99.

The results of the measurement carried out in terms of the above-described lenticular lens sheets 10A, 10B and 10C of Examples 1, 2 and 3, respectively, and those of the measurement carried out in terms of the rear projection screens produced by combining these lenticular lens sheets and the Fresnel lens sheet 20 shown in FIG. 7 are shown in Table 1 below. The light diffusion properties of the lenticular lens sheets and those of the rear projection screens were determined by a micro-deviation angle luminance meter. It is noted that the Fresnel lens sheet 20 was made by using, as the base 21a, the above-described impact-resistant acrylic resin (thickness 2.5 mm) into which 2.0 parts by weight of the above-described acrylic beads having a mean particle diameter of 30 μm (refractive index 1.49) had been incorporated, and forming the Fresnel lens part 21b on top of this base by using an ultraviolet-light-curable resin, by means of a UV production method.

TABLE 1

| | Pitch (mm) | Thickness (mm) | Shape of Light-Entering Lens | Shape of Light-Emerging Lens | 1/2 Luminance Angle (°) | 1/3 Luminance Angle (°) | 1/10 Luminance Angle (°) | Appearance |
|---|---|---|---|---|---|---|---|---|
| Example 1 | 0.36 | 0.67 | −0.1 | −0.2R | 25 / 28 | 34 / 37 | 37 / 42 | ○ |
| Example 2 | 0.35 | 0.43 | −0.3 | −0.2R | 31 / 35 | 41 / 44 | 49 / 52 | Δ |
| Example 3 | 0.35 | 0.54 | −0.3 | −0.2R | 31 / 35 | 40 / 42 | 45 / 48 | ○ |

In the above Table 1, the conic al coefficient k of the light-entering lens 11 is shown in the column "Shape of Light-Entering Lens". Further, in the column "Shape of Light-Emerging Lens", the shape of the cross section of the light-emerging lens 12 is shown. "−0.2R" in this column means that the shape of the cross section of the light-emerging lens 12 is a part of a circle (circular arc) having a diameter of 0.2 mm, and the symbol minus means that the arc is not convex (plus) but concave.

In the column "Luminance Angle (½ Luminance Angle, ⅓ Luminance Angle, ⅒ Luminance Angle)", those angles at which the gains are ½, ⅓ and ⅒ of the central gain (the gain when the deviation angle is 0°) are shown, respectively. For example, "25" shown in the column "½ Luminance Angle" for Example 1 means that the angle at which the gain is ½ of the central gain (the gain when the deviation angle is 0°) is 25°. It is noted that the ½ luminance angle as used herein is equal to the previously-mentioned horizontal half angle ($\alpha H$). Further, in the upper row of the column showing the luminance angle, the results of the measurement carried out in terms of the lenticular lens sheets 10A, 10B and 10C alone are shown, while in the lower row, the results of the measurement carried out in terms of the rear projection screens made by combining these lenticular lens sheets and the Fresnel lens sheet 20 are shown. As shown in the above Table 1, with respect to Example 1, the ½ luminance angle of the rear projection screen which is a combination of the lenticular lens sheet 10A and the Fresnel lens sheet 20 is nearly 30°; and with respect to Examples 2 and 3, 35° was able to be ensured as the ½ luminance angle like in the case of conventional lenticular lens sheets in which the pitch of the light-entering lens 11 is 0.7 mm or more. Moreover, with respect to Examples 2 and 3, a value of nearly 50° was able to be ensured as the ⅒ luminance angle like in the case of conventional lenticular lens sleets.

Further, in the column "Appearance", the appearances (the degree of roughness) of the lenticular lens sheets 10A, 10B and 10C are shown. As shown in the above Table 1, with respect to Example 2, a slightly rough appearance was observed; on the other hand, with respect to Examples 1 and 3, a good appearance free from roughness was observed.

In the case where the pitch of the light-entering lens 11 is made approximately 0.35 mm in order to make a moire pattern which is produced on a rear projection screen obscure, it has been necessary, in conventional lenticular lens sheets, to make the thickness of the lenticular lens sheet approximately 0.45 mm or less. However, in the lenticular lens sheets of Examples 1 to 3, it is possible to make the thickness of the lenticular lens sheet as relatively large as approximately 0.67 mm and 0.54 mm even when black stripes are provided. Therefore, even when the lenticular lens sheet is made by the use of an acrylic resin, it is possible to prevent the lenticular lens sheet from having decreased rigidity and from being easily broken; and, in addition, it is possible to make the lenticular lens sheet by means of extrusion molding or the like with high accuracy.

What is claimed is:

1. A rear projection screen for use in a rear projection type television, comprising:
   a Fresnel lens sheet for making projected rays almost parallel with each other; and
   a lenticular lens sheet arranged on the light-emerging side of the Fresnel lens sheet,
   wherein (1) the lenticular lens sheet comprises a light-entering lens part formed on the light-entering surface, in which a plurality of light-entering lenses, each having a substantially elliptical cross section, are arranged, and a light-emerging lens part formed on a light-emerging-side surface, in which a plurality of light-emerging lenses, each having a concave cross section, are arranged so that they correspond to condensing positions of the respective light-entering lenses in the light-entering lens part, and
   the focal points of the respective light-entering lenses are inside the corresponding light-emerging lenses.

2. The rear projection screen according to claim 1, wherein the Fresnel lens sheet comprises a light-diffusing element.

3. A rear projection screen for use in a rear projection type television, comprising:
   a Fresnel lens sheet for making projected rays almost parallel with each other; and
   a lenticular lens sheet arranged on a light-emerging of the Fresnel lens sheet,
   wherein (1) the lenticular lens sheet comprises a light-entering lens part formed on a light-entering surface, in which a plurality of light-entering lenses, each having a substantially elliptical cross sections are arranged, a light-emerging lens part formed on a light-emerging surface, in which a plurality of light-emerging lenses, each having a concave cross section, are arranged so that they correspond to condensing positions of the respective light-entering lenses in the light-entering-side lens part, and a plurality of light-absorbing layers formed on the light-emerging surface, arranged so that they correspond to non-condensing positions of the respective light-entering lenses in the light-entering lens part, and
   the focal points of the respective light-entering lenses are inside the corresponding light-emerging lenses.

4. The rear projection screen according to claim 3, wherein the Fresnel lens sheet comprises a light-diffusing element.

5. A lenticular lens sheet comprising:
   a light-entering-side lens part formed on a light-entering surface, in which a plurality of light-entering lenses, each having a substantially elliptical cross section, are arranged, and
   a light-emerging-side lens part formed on a light-emerging surface, in which a plurality of light-emerging lenses, each having a concave cross section, are arranged so that they correspond to condensing positions of the respective light-entering lenses in the light-entering-side lens part,
   wherein the focal points of the respective light-entering lenses are inside the corresponding light-emerging lenses.

6. A lenticular lens sheet comprising:
   a light-entering-side lens part formed on a light-entering surface, in which a plurality of light-entering lenses, each having a substantially elliptical cross section, are arranged,
   a light-emerging-side lens part formed on a light-emerging surface, in which a plurality of light-emerging lenses, each having a concave cross section, are arranged so that they correspond to condensing positions of the respective light-entering lenses in the light-entering-side lens part, and
   a plurality of light-absorbing layers formed on the light-emerging surfaces, arranged so that they correspond to non-condensing positions of the respective light-entering lenses in the light-entering lens part, wherein the focal points of the respective light-entering lenses are inside the corresponding light-emerging lenses.

7. The lenticular lens sheet according to claim 5, wherein the relationship between the pitch p (mm) of each one of the light-entering lenses in the light-entering-side lens part and the thickness t (mm) of the lenticular lens sheet is $1.3 \leq t/p \leq 1.9$.

8. The lenticular lens sheet according to claim 5, wherein the conical coefficient k of each one of the light-entering lenses in the light-entering lens part is in the range $-0.035 \leq k \leq -0.1$.

9. The lenticular lens sheet according to claim 6, wherein the relationship between the pitch p (mm) of each one of the light-entering lenses in the light-entering lens part and the thickness t (mm) of the lenticular lens sheet is $1.3 \leq t/p \leq 1.9$.

10. The lenticular lens sheet according to claim 6, wherein the conical coefficient k of each one of the light-entering lenses in the light-entering lens part is in the range $-0.35 \leq k \leq -0.1$.

11. The lenticular lens sheet according to claim 6, wherein a protruded portion having a substantially rectangular cross section is formed on the light-emerging surface, at a position corresponding to the non-condensing position of each one of the light-entering lenses in the light-entering lens part, and the light-absorbing layers are formed on the top faces of these protruded portions.

12. The lenticular lens sheet according to claim 11, wherein a non-diffusing layer containing no diffusing agent is formed on the surface of the protruded portions.

13. The lenticular lens sheet according to claim 6, wherein a protruded portion having a substantially trapezoidal cross section is formed on the light-emerging surface, at a position corresponding to the non-condensing position of each one of the light-entering lenses in the light-entering lens part, and the light-absorbing layers are formed on the top faces of these protruded portions.

14. The lenticular lens sheet according to claim 13, wherein the light-absorbing layers are also formed on the inclined faces, in addition to the top faces, of the protruded portions.

15. The lenticular lens sheet according to claim 14, wherein a non-diffusing layer containing no diffusing agent is formed on the surface of the protruded portions.

16. The lenticular lens sheet according to claim 6, wherein the light-emerging surface has 60% or more of light-absorbing layers constituting said light-emerging surface.

* * * * *